United States Patent
Corbillon et al.

(10) Patent No.: US 12,289,499 B2
(45) Date of Patent: Apr. 29, 2025

(54) METHOD AND SYSTEM FOR REQUESTING TILE STREAMS

(71) Applicant: TILEDMEDIA B.V., Rotterdam (NL)

(72) Inventors: Xavier Albert Jean-Pierre Corbillon, Rotterdam (NL); Marinus Thomas Van Eck, Rotterdam (NL); Ray Van Brandenburg, Rotterdam (NL); Frederik Harm Klok, Rotterdam (NL)

(73) Assignee: TILEDMEDIA B.V., Rotterdam (NL)

( * ) Notice: Subject to any disclaimer, the term of this patent is extended or adjusted under 35 U.S.C. 154(b) by 0 days.

(21) Appl. No.: 18/573,145

(22) PCT Filed: Jun. 22, 2022

(86) PCT No.: PCT/EP2022/067045
§ 371 (c)(1),
(2) Date: Dec. 21, 2023

(87) PCT Pub. No.: WO2022/268893
PCT Pub. Date: Dec. 29, 2022

(65) Prior Publication Data
US 2024/0305862 A1  Sep. 12, 2024

(30) Foreign Application Priority Data
Jun. 24, 2021  (EP) ...................................... 21181583

(51) Int. Cl.
*H04N 21/4728* (2011.01)
*H04N 21/2662* (2011.01)

(52) U.S. Cl.
CPC ..... *H04N 21/4728* (2013.01); *H04N 21/2662* (2013.01)

(58) Field of Classification Search
None
See application file for complete search history.

(56) References Cited

U.S. PATENT DOCUMENTS

2017/0155912 A1  6/2017  Thomas et al.
2018/0160160 A1*  6/2018  Swaminathan ...... H04N 21/816
(Continued)

FOREIGN PATENT DOCUMENTS

EP  3454566 A1  3/2019
EP  3503559 A1 * 6/2019
(Continued)

OTHER PUBLICATIONS

International Search Report and Written Opinion for corresponding International application No. PCT/EP2022/067045; dated Oct. 12, 2022 (14 pages).

*Primary Examiner* — Junior O Mendoza
(74) *Attorney, Agent, or Firm* — Mendelsohn Dunleavy PC; Kevin J. Dunleavy

(57) ABSTRACT

A computer-implemented method is disclosed for requesting tile streams for rendering a spatial part of an immersive video on a display of a client device. In this method, a server system stores a plurality of tile streams. Each tile stream represents a spatial part of the immersive video and each tile stream comprises a sequence of tile frames that are associated with respective times in the video. Further, the plurality of tile streams comprises a first set of high quality tile streams having a relatively high quality and comprises a second set of one or more low quality tile streams having a relatively low quality and/or a third set of one or more intermediate quality tile streams having a relatively intermediate quality. The method comprises based on a determined value for a parameter indicative of how many requested high quality tile frames are received not in time for properly rending them on the display, refraining, at least for some time period, from requesting high quality tile streams.

20 Claims, 6 Drawing Sheets

Requested and received high quality tile frame

Requested yet not received high quality tile frame

Non-requested high quality tile frame

Low quality tile frame

(56) References Cited

U.S. PATENT DOCUMENTS

2018/0176279 A1\* 6/2018 Chalmers ................ H04L 65/70
2019/0310472 A1\* 10/2019 Schilt ...................... G06F 3/015

FOREIGN PATENT DOCUMENTS

| WO | WO-2019048426 A1 \* | 3/2019 | ....... H04N 21/21805 |
| WO | 2020008106 A1 | 1/2020 | |

\* cited by examiner

METHOD AND SYSTEM FOR REQUESTING TILE STREAMS

FIELD OF THE INVENTION

This disclosure relates to methods and system for requesting tile streams for rendering a spatial part of an immersive video on a display of a client device. In particular, this disclosure relates to such methods and systems wherein based on a parameter value, high quality tile streams are not requested. This disclosure further relates to a data processing system, computer programs and computer-readable storage media for executing the method.

BACKGROUND

The increasing availability and use of Virtual Reality headsets have given rise to cameras that support new video formats, such as those that can record full 360-degree spherical video (often referred to as VR360 or 360VR video). Content recorded by such cameras is not only consumed in VR headsets, but is also made available on regular displays, where users can use their fingers, gestures or their mouse to navigate in the video.

Collectively referred to as 'immersive' video, there exists a wide variety of such new video formats, with more variants reaching the market every day. Some of these are cylindrical versus spherical in nature. Others record in 180 or 270 degree instead of the full 360. There are several different approaches to 3D, with some cameras being monoscopic, others stereoscopic and even others being partially stereoscopic (with only a certain area of the video being recorded stereoscopically, with the rest recorded monoscopically).

Regardless of the exact format, what binds these different content formats together is the fact that a user typically only views a small area of the video at any given time. The part of the immersive video that is presented to the user is typically referred to as the viewport. With a significant percentage of immersive video being viewed through VR headsets, where the display is very close to the human eye, the resolution of the recorded video needs to be very high in order to not come across as pixelated (and thus low quality) to the end user. This poor quality seriously impedes the end-user quality of experience (QoE).

For traditional video being displayed on a smartphone or tablet, HD resolutions (1920×1080 pixels) are considered to be sufficient for the user to not being able to notice individual pixels. Large TVs screens obviously need a higher resolution when viewed up close, which is the reason newer TVs typically support Ultra HD (3840×2160 pixels; also referred to as 4K, because it has roughly 4000 horizontal pixels) resolutions. Even higher resolutions are generally considered to be unnoticeable to end users.

The same cannot be said for VR headsets though. Due to the closeness of the human eye to the display in a VR headset, the pixel size needs to be much smaller for the user not to be able to discern them. Because of this, the resolution of VR displays, and thus the content being shown on them, needs to be of significantly higher quality (resolution). Research has suggested that a VR headset will need to display video at roughly 8 k horizontal pixels per eye (making the total display resolution 8 times UHD, or 32 times HD) for the individual pixels to no longer be visible to the end user. And given that users only ever see a small part of a 360-degree video at the same time, this means that the total resolution being recorded will need to be in the order of 32000 pixels horizontally and 16000 vertically (32 k×16 k), so two orders of magnitude higher than what most traditional video content is being recorded at today. While today's cameras are not able to record 32K video, 8K and 12K cameras are starting to become available.

The primary factor limiting immersive video quality, however, is not so much the camera technology, but the distribution technology. Sending traditional UHD video, or even high-quality HD, over the current internet, is not only very complex and expensive, it is also limited to those countries and users that have a sufficiently fast internet connection. With immersive video requiring an even higher quality video, distribution of immersive media is a big challenge.

There currently exists a variety of distribution methods for delivering immersive video. The first and most used at this moment is also the simplest one, which is simply delivering the immersive video to the client as if it were a normal traditional video. This means the full spherical video is being delivered to the client, decoded on the end-user device, and projected on the VR headset. The advantage of this method is that it re-uses existing technology and distribution methods, and that no new techniques are required. The downside is that it is either very expensive in terms of bandwidth (given that an immersive video will typically be of higher resolution than a traditional video), which will reduce reach and increase cost, or low in quality (if the quality is degraded to accommodate for lower bandwidth).

A second group of approaches, and one that is increasingly explored in the research community, is also referred to as 'viewport-adaptive streaming'. While there exist several different approaches for viewport-adaptive streaming, each with its own advantages and drawbacks, the most scalable and promising is called tiled streaming. Tiled streaming is described in US 2017/0155912 A1, for example. With tiled streaming, the original immersive video (whether it is cylindrical, spherical, or otherwise) is split up into individual spatial elements, which may be referred to as tile streams, and each frame of the video is split up into individual spatial-element frames, which may be referred to as tile frames. Typically, the tile frames are rectangular, however, in principle, they may have any shape or form. Each tile frame is then independently encoded in such a way that it can be successfully decoded on the client side without the client requiring access to the other tile frames. By successively retrieving individual tile frames based on the viewport, the client is able to only retrieve and decode the area of the video that the user is interested in. By only streaming the area of the immersive video that the user is interested in, the total bandwidth necessary to distribute the immersive video can be reduced significantly. This reduction in bandwidth can either be used to increase reach (meaning a higher percentage of users will have sufficient bandwidth to receive the streaming video) and reduce cost (less bits transferred), or to increase quality, or to achieve a combination of these goals. By only sending a small portion of the video at any given time, that region can be sent at a higher quality than would normally have been possible without increasing bandwidth.

A drawback of this approach is the time it takes for the client to retrieve the appropriate tile frames from the network when the user turns his head. The end to end latency between the user turning his head and the tile frames being fetched from the network and rendered on a display of client device, such as a the headset, also referred to as the motion-to-photon latency, significantly impacts the Quality of Experience (QoE). Latencies as little as 100 milliseconds can already make for a lower user QoE.

Most tiled streaming approaches discussed in the state-of-the-art are based on, or are an extension of, HTTP Adaptive Streaming. With HTTP Adaptive Streaming, of which MPEG DASH and Apple HLS are the dominant examples, a video stream is cut up into temporal elements, called segments, each typically between 3 and 30 seconds long. When watching a video, a client sequentially fetches successive segments from the network via standard HTTP, buffers them, and feeds them to the video decoder. Where HTTP Adaptive Streaming gets its name from is that each segment can be made available in multiple different qualities/resolutions (called "representations"), with the client able to switch between the different qualities based on the available bandwidth. Switching quality (due to changing network link conditions) would typically happen at segment boundaries.

When applied to tiled streaming, each tile stream is typically represented as an independent video stream, where each tile stream is itself split up into multiple temporal segments of tile frames. A common manifest file [e.g. DASH-SRD: ISO/IEC 23009-1:2014], or container format then contains pointers to the individual segments of tile frames and describes their temporal and spatial relationship. From a client point of view, the client first downloads and parses the manifest file and then sets up multiple HTTP Adaptive Streaming sessions, one for each tile stream. Each session will consist of sequentially downloading successive segments. When a user turns his head, the HTTP Adaptive Streaming sessions for those tile streams no longer in the field of view will be cancelled, and new ones will be started for the tile streams that just entered the field of view.

While HTTP Adaptive Streaming is well suited for traditional video streaming, it is less suited for tiled streaming, primarily because of latency. When a user turns his head with a VR headset, the human vestibular system expects the view captured by the eyes to move along accordingly. When this doesn't happen, or doesn't happen fast enough, motion sickness occurs very quickly. Research has shown that this problem already occurs if the delay between head movement and the eyes registering the appropriate movement is more than 8-10 ms. This means that tile frames need to be retrieved very fast, or that some visual information is needed that is always present and that can be displayed in a way that is consistent with a user's head movement.

Given that 8-10 ms is an extremely short time for a system to respond to sensor data, fetch video data over the internet, decode that data and show it to the end-user, this is typically not achieved in HTTP Adaptive Streaming-based tiled streaming solutions. It is possible to work around this by 1) always downloading a field of view that is larger than that which is experienced by the end-user, thereby creating a sort of spatial buffer, and/or 2) always streaming a low-resolution fallback/base layer that can be shown while the system waits for the high-resolution tile frames to arrive.

If network conditions deteriorate, for example because the available bandwidth reduces, some of the tile frames may not be received in time for properly rendering them on the display. This is undesired, as it may cause that only some parts of the viewport contain requested high quality tile frames, whereas other parts of the viewport contain low quality tile frames or do not contain a tile frame at all. A viewport with tile frames of varying quality is highly distorting for a user and significantly negatively impacts the user experience. It might be even preferred to have a viewport entirely consisting of lower quality tile frames than a viewport wherein both low quality tile frames and high quality tile frames are present.

When HTTP Adaptive Streaming is implemented for regular video streaming (non-tiled streaming), typically, the network conditions are monitored by monitoring the fullness of a buffer. Such buffer contains video frames that have already been received yet that are still to be displayed. If the buffer starts to deplete, this typically indicates deteriorating network conditions and consequently a lower quality stream may be selected.

Unfortunately, monitoring the fullness of a buffer is not suitable for viewport adaptive streaming (VAS) techniques for several reasons. Firstly, with VAS, when the viewport moves, typically as a result of a user moving his or her head, a large part of the information in the buffer may become irrelevant (and may subsequently be discarded). To illustrate, if the buffer has stored ten seconds of playtime of a tile stream that represents a particular part of the immersive video, and the user suddenly moves his head such that the viewport no longer contains said particular part, then the ten seconds of that tile stream will not be rendered any more on the display and thus has become irrelevant. Thus, with VAS, the size of the buffer may vary significantly, and the variation is not necessarily an indication of network conditions. Secondly, the buffer fullness does not provide an accurate indication of the round trip time (RTT), although for VAS the RTT has a significant impact on streaming performance. For regular streaming, a buffer can be filled quite well also if the RTT is long. However, for VAS, it is important that a buffer is filled quickly after a movement of the viewport with new tile frames for parts of the video that have newly entered the viewport, requiring a low RTT.

In light of the above, there is a need in the art for a method for requesting tile streams that enables to switch between different qualities when appropriate.

SUMMARY

To this end, a computer-implemented method is disclosed for requesting tile streams for rendering a spatial part of an immersive video on a display of a client device. In this method, a server system stores a plurality of tile streams. Each tile stream represents a spatial part of the immersive video and each tile stream comprises a sequence of tile frames that are associated with respective times in the video. Further, the plurality of tile streams comprises a first set of high quality tile streams having a relatively high quality and comprises a second set of one or more low quality tile streams having a relatively low quality and/or a third set of one or more intermediate quality tile streams having a relatively intermediate quality. The first set of high quality tile streams represents a first version of the immersive video and the second set of one or more low quality tile streams represents a second version of the immersive video and/or the third set of intermediate quality tile streams represents a third version of the immersive video.

The method comprises (i) selecting high quality tile streams from the first set of high quality tile streams. The selected high quality tile streams comprise respective tile frames associated with a particular time for rendering a spatial region of the immersive video at said particular time. Preferably the spatial region comprises an expected viewport at said particular time. The method also comprises (ii) transmitting a request to the server system for the selected high quality tile streams and (iii) receiving one or more of said tile frames associated with the particular time out of the requested high quality tile streams in time for properly rendering them on the display at said particular time. The method further comprises (iv) receiving one or more of said tile frames associated with the particular time out of the requested high quality tile streams not in time for properly rendering them on the display at said particular time, for example because these one or more tile frames are received too late or because these one or more tile frames are not received at all. The method further comprises (v) determining a value for a parameter indicative of how many of said one or more tile frames associated with the particular time out of the requested high quality tile streams are received not in time for properly rendering them on the display at the particular time. Then, the method comprises (vi) based on the determined value for the parameter, refraining, at least for some time period, from requesting high quality tile streams out of the first set of high quality tile streams from the server system. The method also comprises (vii) during said time period, requesting one or more low quality tile streams from the second set of one or more low quality tile streams from the server system and/or requesting one or more intermediate quality tile streams from the third set of one or more intermediate quality tile streams from the server system.

This method provides a very simple and efficient way to switch to lower quality tile streams when network conditions deteriorate too much. As explained in the background section, buffer fullness is not an adequate measure for network conditions in the context of tiled streaming. In contrast, the method disclosed herein uses a parameter that is indicative of how many tile frames, although requested, are received too late for properly rendering them on the display at the time that they should be rendered. The inventors have realized that such parameter is indeed an adequate measure for current network conditions. In tiled streaming, multiple tile frames are requested for each time in the video. In other words, each video frame comprises multiple tile frames. Since each requested tile frame may or may not be received in time, the parameter can have, for each time in the video, a range of values and can thus indicate a range of network qualities. To illustrate, if the parameter is simply the ratio between the number of not in time received tile frames, n_missing, for a specific time and the total number of requested tile frames, N, for that specific time, then the value of the parameter for that time is given by n_missing/N, wherein n_missing may be any integer value 0, 1, 2, ..., N−1, N. Hence, the parameter, which may also be referred to as a decision parameter, can be used to indicate a range of network qualities and is thus suitable for basing a decision on whether to switch to a lower quality tile stream or not. In principle, the worse the network conditions are, the more tile frames will be received not in time. Such parameter can be used, for example, to identify a gradual decrease of network conditions over time.

The time with which a tile frame is associated may also be referred as a playtime. Thus, the particular time referred to above may be understood to refer to a particular playtime in the immersive video, for example to playtime "10.5 seconds from the start of the video". Rendering a tile frame on a display at a particular time may be understood to refer to rendering the tile frame on the display at the moment that the video reaches that particular time.

As used herein, requesting one or more tile frames from a particular tile stream may be understood to be an example of requesting that particular tile stream. Receiving a tile frame may be understood as receiving encoded data which the client device can decode in order to obtain the (decoded) tile frame so that it can be rendered on the display of the client device.

Each tile stream is preferably encoded independently from other tile streams. However, within a tile stream, some tile frames may be encoded with reference to other tile frames within that tile stream which results in so-called inter-coded tile frames, and other tile frames may be encoded without reference to other tile frames within the tile stream which results in so-called intra-coded tiles. In the context of VAS, Group of Pictures (GOP) is a term used to describe the order in which so-called intra- and inter-coded tile frames are arranged within a tile stream. A GOP consists of one or more tile frames from a particular tile stream. Encountering a new GOP in an encoded tile stream means that a decoder doesn't need any previous tile frames in order to decode the next ones.

In principle, the higher the quality of a tile stream, the better its tile frames, when rendered on a display, resemble the original video, i.e. the original video as captured by one or more cameras. The quality of a tile stream may be related to the resolution of the video as represented by tile frames in the tile stream, wherein a higher resolution corresponds to a higher quality. As used herein, the resolution of a (decoded) video refers to the number of pixels in each video frame of the video. Thus, the different versions of the immersive video as represented respectively by the first, second and/or third set of tile streams may differ in quality, for example in terms of resolution of the video as represented by the tile frames in the first, second and/or third set of tile streams. The quality of a tile stream may additionally or alternatively be related to the bitrate of the tile stream, wherein a higher bitrate corresponds to a higher quality. The quality of a tile stream may additionally or alternatively be related to the framerate of the video as represented by the tile streams, wherein a higher framerate corresponds to a higher quality. The framerate of a tile stream may be understood as the number of video frames that are rendered per unit of video playtime based on the tile stream, Thus, the different versions of the immersive video as represented respectively by the first, second and/or third set of tile streams may differ in quality, for example in terms of framerate of the video as represented by the tile frames in the first, second and/or third set of tile streams.

For clarity, the high quality tile streams may have a relatively high quality, and the intermediate quality tile streams may have a relatively intermediate quality, and the low quality tile streams may have a relatively low quality, in the sense that the high quality tile streams have a higher quality than the intermediate quality tile streams and the intermediate quality tile streams have a higher quality than the low quality tile streams.

The immersive video may be understood to comprise video frames, wherein each video frame is spatially divided in tile frames. Tile frames belonging to different video frames yet representing a same spatial part of the immersive video may form a tile stream. In this way each tile stream may be associated with a spatial part of the immersive video.

The time period may be predetermined. After the time period, the high quality tile streams from the first set of high quality tile streams may be requested again from the server system.

In an embodiment, the method comprises: based on the determined value for the parameter, requesting, during said time period, one or more intermediate quality tile streams from the third set of one or more intermediate quality tile streams from the server system. Additionally or alternatively, this embodiment comprises based on the determined value for the parameter, requesting, during said time period, one or more low quality tile streams from the second set of one or more low quality tile streams from the server system.

This embodiment enables to request a lower quality tile stream instead of a current higher quality tile stream for which the network conditions are insufficient.

It should be appreciated that if the server system would store two and only two sets of tile streams, one set having a higher quality tile streams than the other, then the other set may be regarded as the intermediate quality tile stream referred to in this disclosure or as the low quality tile stream referred to in this disclosure.

Of course, the server system may store many sets of tile streams, wherein each set is associated with a different quality.

In an embodiment, the method comprises rendering a viewport at said particular time on the display of the client device. The rendered viewport comprising first one or more spatial parts of the immersive video that are respectively represented by one or more of the in time received tile frames and comprising second one or more spatial parts of the immersive video that are respectively represented by one or more of the not in time received tile frames. Thus the rendered viewport has one or more rendered tile frames from high quality tile streams at the first one or more spatial parts and the rendered viewport misses one or more tile frames from high quality tile streams at the second one or more spatial parts in the viewport. The second one or more spatial parts cover a spatial area in the rendered viewport.

This embodiment is advantageous in that still a viewport is rendered even if some of the tile frames are not received in time. This benefits the user experience.

In an embodiment, the method comprises determining the parameter based on the rendered viewport. In this embodiment, the parameter may be an objective video quality parameter that is calculated from the rendered viewport. The parameter may be determined using methods known in the art. Such methods may involve Video Multimethod Assessment Fusion (VMAF) and/or other quality metrics, such as Visual Information Fidelity (VIF), Detail Loss Metric (DLM), Mean Co-Located Pixel Difference (MCPD), Antinoise signal-to-noise ratio (AN-SNR).

In this embodiment, advantageously, the parameter is determined based on an actually rendered viewport. Determining the parameter does not necessarily involve any monitoring of buffer fullness and can be determined directly based on the rendered viewport. The embodiment makes use of the fact that with VAS, the quality of the viewport may vary because each rendered viewport may comprise a different number of high quality tile frames. For example, a first viewport, rendered under good network conditions, may entirely consist of high quality tile frames, whereas a later rendered viewport, rendered under bad network conditions, may consist of only 50% high quality tile frames and 50% low quality tile frames. Hence, the quality of the viewport can be used as a direct indication of network quality, in particular as a direct indication whether the network conditions are sufficiently good so that at least some minimum number of the high quality tile frames requested from the server system are received in time for proper rendering. If many of the requested high quality tile frames are received too late, or not received at all, then the user experience will deteriorate dramatically, and then preferably high quality tile streams are not requested anymore.

With regular, non-tiled streaming, in principle, the quality of the rendered viewport is quite constant. For example, with regular streaming, the resolution of the viewport is constant. If the network conditions deteriorate gradually, then a regular video may stall at some point when the buffer has become empty. However, in such case, the resolution of the viewport, i.e. the total number of rendered pixels in the viewport, will not gradually decrease prior to such stall. In contrast, with VAS, a gradual deterioration of network conditions will cause rendered viewports to contain less and less high quality tile frames as a result of which the quality, e.g. the resolution, of the rendered viewports will decrease gradually as well.

When the quality of the rendered viewport is assessed, then automatically all factors influencing this quality are taken into account, including for example the round trip time, which is highly relevant to VAS. If the round trip time has become very long, then this may cause that, upon a movement of the viewport, only a limited number of the requested high quality tile frames are rendered in the viewport, because no tile frames may have been received yet for spatial parts of the video that have newly entered into the viewport.

In an embodiment, the parameter is indicative of a size of the spatial area covered by the second one or more spatial parts.

In principle, the larger the spatial area in the viewport that is covered by the second one or more spatial parts, the lower the quality of the viewport. If this spatial area is very large, then relatively many requested high quality tile frames are received too late or not received all, resulting in a low quality viewport.

An example of the parameter in this embodiment would be the resolution of the rendered viewport. The lower the resolution, the larger the size of the spatial area covered by the second one or more spatial parts. As such, the resolution of the viewport is indicative of the size of the spatial area covered by the second one or more spatial parts. The indicated size of the spatial area may thus be a relative size, e.g. relative to the size of the entire viewport and/or relative to the size of spatial area covered by high quality tile frames. As used herein, the viewport refers to a spatial part of the immersive video, thus to decoded video and not so much to the hardware on which the decoded video is presented, i.e. not so much to the display of the client device. Thus, the resolution of the viewport refers to decoded video. The resolution of decoded video and thus of the viewport indicates the total number of rendered pixels in the viewport and is in principle independent of the number of hardware pixels that the display of the client device contains. Of course, when determining the resolution, only pixels should be counted that were rendered based on received tile streams. Dummy pixels, e.g. "grey tiles", should be disregarded.

In such embodiment, the parameter may be referred to as a viewport quality parameter as it is indicative of a quality of the rendered viewport.

In an embodiment, the parameter is indicative of
a) the size of said spatial area covered by said second one or more spatial parts, and/or
b) how many tile frames from high quality tile streams are missing in the rendered viewport, and/or
c) a size of a further spatial area in the rendered view port covered by said first one or more spatial parts, and/or
d) how many tile frames from the first set of high quality tile streams are present in the rendered viewport, and/or
e) a ratio between the size of said spatial area and the size of said further spatial area, and/or
f) a ratio between the size of said spatial area and a size of the rendered viewport, and/or g) a ratio between the size of said further spatial area and the size of the rendered viewport, and/or h) how many pixels the rendered viewport contains, and/or i) a resolution of the rendered viewport, and/or j) a ratio between the size of the further spatial area and a size of a spatial area in the viewport covered by tile frames from low quality streams.

All the above parameters may be understood to be indicative of how many of the requested high quality tile frames are received not in time for proper rendering. The parameter may be determined using any mathematical function using the size of said spatial area covered by said second one or more spatial parts and, optionally, the size of the further spatial area.

Preferably, the parameter value is compared to a threshold value and the step of refraining from requesting high quality tile streams from the server system is performed based on this comparison.

Determining which value to use for a specific parameter can be readily determined, for example based on previous measurements of this parameter in association with assessed qualities of associated viewports. In this way, it can be assessed for which values of the specific parameter, the quality of experience for the user is still acceptable and for which values the quality of experience becomes too low.

In an embodiment, the method comprises determining that one or more of said tile frames associated with the particular time out of the requested high quality tile streams are not received in time for properly rendering them on the display at said particular time. Preferably this step comprises, for each of the not in time received tile frame, determining that it has not been received at or before a first predetermined time that is prior to the particular time and/or that it has not been decoded at or before a second predetermined time that is prior to the particular time.

This embodiment is advantageous in that it does not require to actually render the viewport for determining the parameter value. Before a tile frame is rendered in a viewport, it should, after it has been received, be decoded and the rendering process should be completed, which takes time. The (average) time of these processes may be known, which allows to set a certain time at which tile frames should be received or decoded at the latest so that there is enough time to perform these processes before the tile frames should actually be rendered on the display, i.e. when the video reaches the particular playtime associated with these tile frames. If a requested high quality tile frame has not yet been received when this set time is reached, then it may be counted as missing.

In an embodiment, the method comprises transmitting a request to the server system for one or more low quality tile streams from the second set of one or more low quality tile streams. The requested one or more low quality tile streams comprise respective one or more tile frames associated with the particular time for rendering at least part of, preferably the entire, immersive video at the particular time. This embodiment further comprises receiving one or more of the tile frames associated with the particular time out of the requested low quality tile streams. Further, in this embodiment, the viewport is rendered such that the rendered viewport comprises, at each spatial portion in the viewport for which no tile frame out of a high quality tile stream is available, at least part of a received tile frame associated with the particular time out of a low quality tile stream.

This embodiment ensures that even if a high quality tile for a particular spatial portion in in the viewport has not been received in time, the viewport still contains a lower quality tile frame at this particular spatial portion. Herewith, the embodiment prevents that the viewport contains black holes at the spatial portions for which no tile frame out of a high quality tile stream is available. As indicated, preferably, the low quality tile stream is requested for the entire immersive video and for every time in the video, so that always low quality tile frames are available for any current viewport.

In an embodiment, the method comprises requesting, during said time period, one or more low quality tile streams from the second set of low quality tile streams irrespective of the determined value for the parameter, and request, during said time period, one or more intermediated quality tile streams from the third set of tile streams based on the determined value for the parameter. This embodiment may function such that the low quality tile streams are always requested, and the intermediate quality tile streams are requested only when the network conditions are too bad for properly receiving the high quality tile streams.

In an embodiment, the method comprises repeatedly determining a value for the parameter by repeatedly performing the sequence of steps (i)-(v), albeit for different respective times in the video. This embodiment also comprises, based on the determined values for the parameter, refraining, at least for some time period, from requesting high quality tile streams out of the first set of high quality tile streams from the server system.

This embodiment optionally comprises determining some aggregate parameter (value) based on the different determined parameter values. In an example, the resolution of each rendered viewport is monitored and as aggregate quality parameter an average of these resolutions of the last ten rendered viewports is determined. Such aggregate quality parameter may be an average and/or rate of change of any parameter described herein that indicates a quality of an individual viewport.

This embodiment enables to reduce the frequency with which the client switches between quality streams. If for example the network conditions are bad only during a short time period, then it may be undesired to switch to a lower quality stream.

Typically, when a particular tile stream is requested from the server system, the tile stream comprises multiple tile frames that are to be rendered at different times, later than the particular time, in the viewport. Such already requested tile frames are, of course, not per se selected/requested again in a next iteration of the sequence of steps (i)-(v).

To illustrate, in an embodiment, the method comprises selecting further high quality tile streams from the first set of high quality tile streams, the selected further high quality tile streams comprising respective tile frames associated with a further particular time for rendering a spatial region of the immersive video at said further particular time, preferably said spatial region comprising a further expected viewport at said further particular time, and transmitting a request to the server system for the selected further high quality tile streams, and receiving one or more of said tile frames associated with the further particular time out of the requested further high quality tile streams in time for properly rendering them on the display at said further particular time, and receiving one or more of said tile frames associated with the further particular time out of the requested further high quality tile streams not in time for properly rendering them on the display at said particular time and determining a further value for the parameter indicative of how many of said one or more tile frames associated with the further particular time out of the requested high quality tile streams are received not in time for properly rendering them on the display at the further particular time and refraining, based on the determined value and the determined further value for the parameter, at least for said time period, from requesting high quality tile streams out of the first set of high quality tile streams from the server system.

This embodiment may comprises rendering the further viewport at the further particular time. The rendered further viewport may comprise first further one or more spatial parts of the immersive video that are respectively represented by one or more of the in time received tile frames associated with the further particular time out of the requested further high quality tile streams and comprising second further one or more spatial parts of the immersive video that are respectively represented by one or more of the not in time received tile frames associated with the further particular time out of the requested further high quality tile streams thus the rendered further viewport having one or more rendered tile frames from high quality tile streams at the first further one or more spatial parts and the rendered further viewport missing one or more tile frames from high quality tile streams at the second further one or more spatial parts in the further viewport, said second further one or more spatial parts covering a further spatial area in the rendered further viewport. The further value may be determined based on the rendered further viewport. Also, the further value may indicate a size of said further spatial area covered by the second further one or more spatial parts.

In an embodiment, the method comprises repeatedly determining a value for the parameter comprises repeatedly rendering viewports at respective times and determining, for each rendered viewport, an associated value for the parameter based on the rendered viewport in question.

In an embodiment, the step of, based on the determined value for the parameter, refraining, at least for some time period, from requesting high quality tile streams out of the first set of high quality tile streams from the server system, comprises comparing the determined value for the parameter with a threshold value and, based on this comparison, refraining, at least for some time period, from requesting high quality tile streams out of the first set of high quality tile streams from the server system.

This embodiment provides a convenient manner for determining whether to continue requesting high quality tile streams or not.

In an embodiment, the method comprises measuring movement of the viewport across the immersive video, wherein the step of refraining from requesting high quality tile streams from the server system is performed based on the measured movement of the viewport as well.

In an example, the measured movement is compared to a movement threshold value. If the measured movement is relatively high, then this movement may be causing relatively many high quality tile frames to be not in time received, as opposed to bad network conditions causing it. If the movement of the viewport is significant, then refraining from requesting high quality tile streams may be inappropriate. During significant head movement, the quality of the rendered viewports is also less important, because a user is less likely to notice the lower quality. However, when the movement stops, it should be possible to request and properly render tile frames from high quality streams again, assuming, of course, that the network conditions are good. Thus, in an embodiment, the step of refraining from requesting tile streams from the first of high quality tile streams from the server system may be performed based on a determination that the measured movement of the viewport is lower than a movement threshold value.

In an example, the above mentioned threshold value with which the value of the parameter may be compared depends on the measured viewport movement. In such case, the method may comprise determining the threshold value for the parameter based on measured viewport movement. Viewport movement may cause the threshold value to be lower or higher, depending on the exact parameter that is compared with the threshold. To illustrate, if the parameter indicates a ratio of in-time received high quality tile frames over total number of requested high quality tile frames, then a higher value of the parameter would be indicative of better network conditions. In such case, a switch may be made to a lower quality tile stream based on a determination that the determined parameter value is lower than a threshold value. In such case, viewport movement may cause the threshold value to be lower. After all, in such case, lower values for the decision parameter are acceptable if the viewport moves significantly.

As another example, if the parameter indicates a ratio of not-in-time received high quality tile frames over total number of requested high quality tile frames, then a lower value of the parameter would be indicative of better network conditions. In such case, a switch may be made to a lower quality tile stream based on a determination that the determined parameter value is higher than a threshold value. In such case, viewport movement may cause the threshold value to be higher. After all, in such case, higher values for the decision parameter are acceptable if the viewport moves significantly.

In another example, the threshold value is fixed and the value of the decision parameter is adjusted as appropriate based on measured viewport movement. To illustrate, if the parameter indicates a ratio of in-time received high quality tile frames over total number of requested high quality tile frames, then the parameter value may be increased based on significant viewport movement before comparing it with the threshold value. As another example, if the parameter indicates a ratio of not-in-time received high quality tile frames over total number of requested high quality tile frames, then the determined parameter value may be lowered based on significant viewport movement before comparing it with the threshold value.

One aspect of this disclosure relates to a data processing system that is configured to perform any of the methods described herein. In particular, the data processing may comprise means, such as processor, for performing any of the methods described herein.

One aspect of this disclosure relates to a computer comprising a computer readable storage medium having computer readable program code embodied therewith, and a processor, preferably a microprocessor, coupled to the computer readable storage medium, wherein responsive to executing the computer readable program code, the processor is configured to perform any of the methods described herein.

One aspect of this disclosure relates to a computer program comprising instructions which, when the program is executed by a computer, cause the computer to carry out any of the methods described herein.

One aspect of this disclosure relates to a computer program or suite of computer programs comprising at least one software code portion or a computer program product storing at least one software code portion, the software code portion, when run on a computer system, being configured for executing any of the methods described herein.

One aspect of this disclosure relates to a non-transitory computer-readable storage medium having stored thereon any of the computer programs described herein.

One aspect of this disclosure relates to a non-transitory computer-readable storage medium storing at least one software code portion, the software code portion, when executed or processed by a computer, is configured to any of the methods described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing client devices (e.g. to the existing or be stored upon manufacturing of these client devices.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

In the figures, identical reference numbers indicate identical or similar elements.

Figure 1:
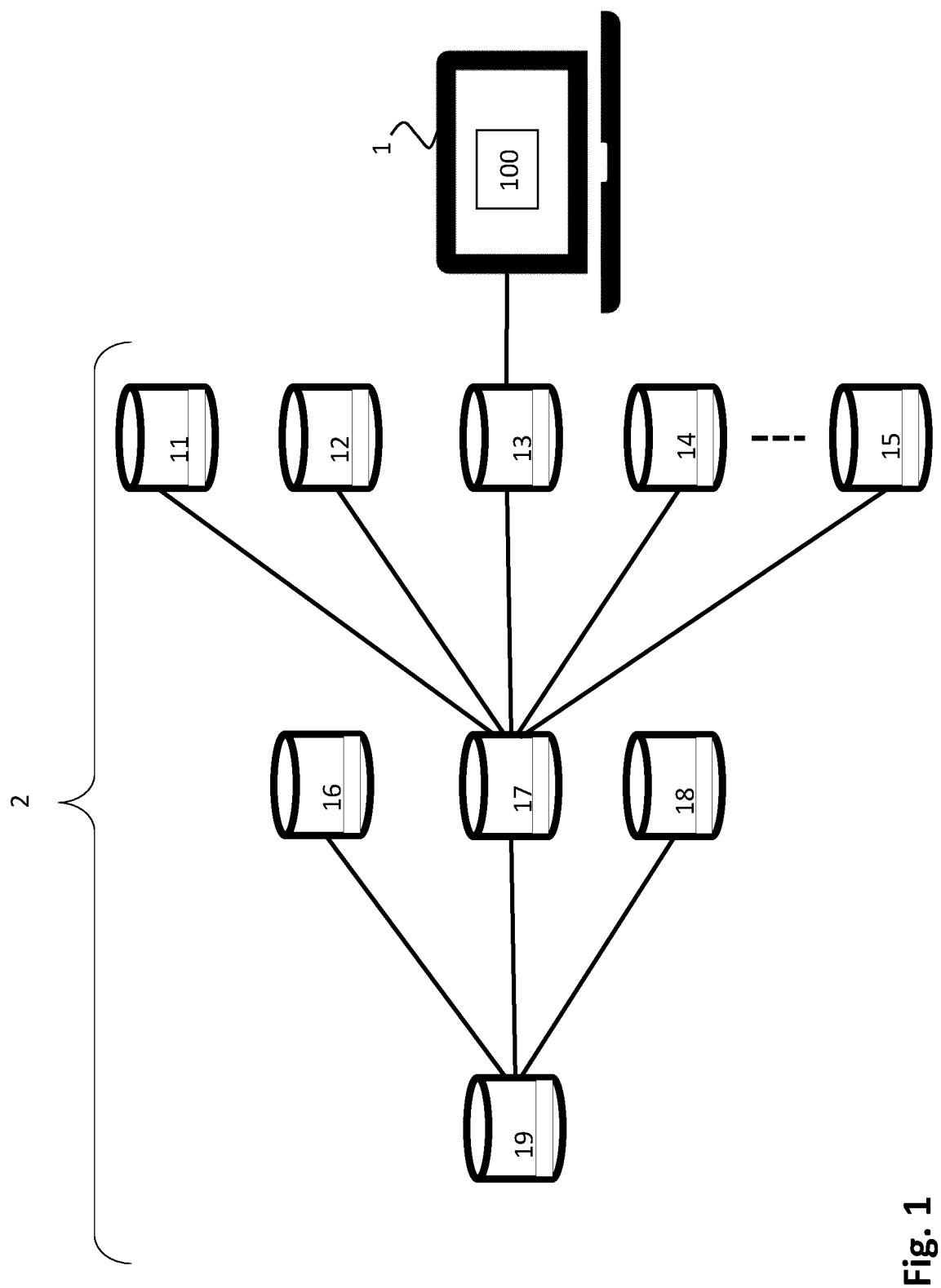
FIG. 1 schematically shows a system for performing the methods disclosed herein.

FIG. 1 schematically shows a system in which the methods described may be advantageous. Herein, a client device 1 is connected to a server system 2, e.g. via a packet switched network such as the internet. The client device 1 is shown as a notebook computer, however, client device 1 may be any device that can connect to a server system 2. The client device 1 may be a PC, laptop, mobile phone, tablet, or a VR headset, for example. The client device 1 may be connected to a VR headset, for example. The client device may also be an edge server. In such case, the rendering of the video may be performed on an edge server, and then the viewport may be streamed to the display of a user device. This enables devices having only the ability to decode regular videos can also benefit from tiled streaming methods.

In the embodiment shown in FIG. 1, the client device 1 comprises a data processing system 100 that is configured to perform the methods described herein and an example of which is described in more detail with reference to FIG. 7. The data processing system 100 may comprise one or more processors (not shown). Such one or more processors of the client device 1 may be a general-purpose processor, e.g. an Intel or an AMD processor, or an application-specific processor, for example. Such one or more processors may comprise multiple cores, for example. The data processing system may run a Unix-based (e.g. Android), Windows or Apple operating system, for example.

The data processing system 100 may comprise a receiver and a transmitter combined in a transceiver of the client device 1. In an alternative embodiment, the client device 1 comprises a receiver and a transmitter that are separate. The transmitter, receiver and/or transceiver may be comprised in a network adapter 116 referred to later in this disclosure. The transceiver of the client device 1 may use, for example, one or more wireless communication technologies such as Wi-Fi, Bluetooth, GPRS, CDMA, UMTS and/or LTE and/or one more wired communication technologies such as Ethernet to communicate with the server system 2, e.g. with the edge cache node 13. The client device 1 may be connected to a server of the server system 2 via other (non-depicted) devices, such as access points, routers and switches.

The client device 1 may also comprise memory elements, e.g. one or more Solid State Disks (SSDs) made out of Flash memory, or one or more hard disks, for example. The client device 1 may comprise other components typical for a client device, e.g. a power supply and/or battery and a display.

The server system 2 is configured to store a plurality of tile streams as will be explained in more detail with reference to FIG. 2. Although FIG. 1 shows that the server system 2 comprises a plurality of severs 11-19, the server system 2 may comprise one and only one server. The plurality of tile streams may be stored on a single server of the server system or be stored on several servers of the server system. Also, multiple servers may store copies of the same tile stream, for example. The server system 2 may be a so-called content distribution network (CDN).

The client device 1 may have stored a so-called manifest file that indicates which encoded tile frames are stored at which location, e.g. at which URL, and thus, ultimately on which particular server. Hence, the client device 10 may, after it has determined that a particular encoded tile frame is to be requested, use the manifest file to determine the server to which the request for the particular encoded tile frame is to be sent.

The client device 1 may be configured to receive user interactions and determine, based on these user interactions, which spatial part of the video is to be rendered on the display. An example of a client device 1 is a head mounted display that is configured to receive user interactions in the sense that it can detect an orientation of a user's head onto which the head-mounted device is currently mounted. Another example would be a desktop computer that may be configured to receive user interactions through a keyboard or mouse. A user may for example use arrows on the keyboard to control which spatial part of the immersive video is presented at the display.

In an embodiment, the data processing system 100 is configured to use a transceiver to transmit requests for selected tile streams to a distribution node of the server system 2. The one or more requests preferably identify a tile stream, e.g. in that they specify one or more tile frames out of that tile stream, and may specify a starting point corresponding substantially to a current time. The requests may be addressed to the origin node 19. The one or more requests arrive at the edge cache 13, e.g. through redirection. The edge cache node 13 may check whether it can fulfill the one or more requests itself and transmits an own request for any tile streams not in its cache to higher-layer cache node 17. The higher-layer cache node 17 checks whether it can fulfill the one or more requests itself and transmits an own request for any tile streams not in its cache to origin node 19. Node 19 may be a streaming server, for example, and may comprise a data processing system 100 as well. The server system shown in FIG. 1 comprises other distribution nodes than edge cache node 13, higher-layer cache node 17 and origin node 19. Edge cache nodes 11-12 and 14-15 and higher-layer cache nodes 16 and 17 are present but are not in the path between client device 1 and origin node 19. In an alternative embodiment, the client device 1 is used in a network or network path without cache nodes. The edge cache nodes 11-14 may be the edge cache nodes for Ireland, Germany, France and Spain, respectively, for example. The higher-layer cache nodes 16-18 may be the higher-layer cache nodes for the U.S., Europe and Asia regions, respectively, for example.

As explained in EP3454566A1 in more detail, a tile stream may comprise both non-inter-coded tile frames (e.g. I-frames) and inter-coded tile frames (e.g. B and P frames).

The data processing system 100 is further configured to receive tile frames out of requested tile streams, for example by using a transceiver of the data processing system 100. The tile frames are typically received in encoded form and may be understood to comprise pixel values for respective spatial positions of the immersive video.

In an embodiment of the client device 1, the data processing system 100 may be configured to display the received tile frames and, optionally, to pause display of the video upon receiving an instruction to pause display of the video.

Any content stored by the server system 2 may have been prepared by a content preparation device (not shown). Such device may comprise an encoder device that is configured to encode video data. The content preparation device may for example receive uncompressed video data representing an immersive video as captured by one or more cameras. Typically, an immersive video is captured by several differently oriented cameras. An immersive video is for example a 180 degrees video or a 360 degrees video. Any video of which only a varying spatial part is shown to the user may be regarded as an immersive video. The encoder device may subsequently encode the raw video data. Preferably, the encoder device outputs encoded tile frames as described herein. The content preparation device may be connected to the server system 2, e.g. via a packet switched network such as the internet. The content preparation device may transmit the encoded tile frames to one or more servers of the server system 2 where the encoded tile frames are stored. Optionally, the content preparation device also comprises an encryption module that is configured to encrypt the encoded tile frames.

Figure 2:
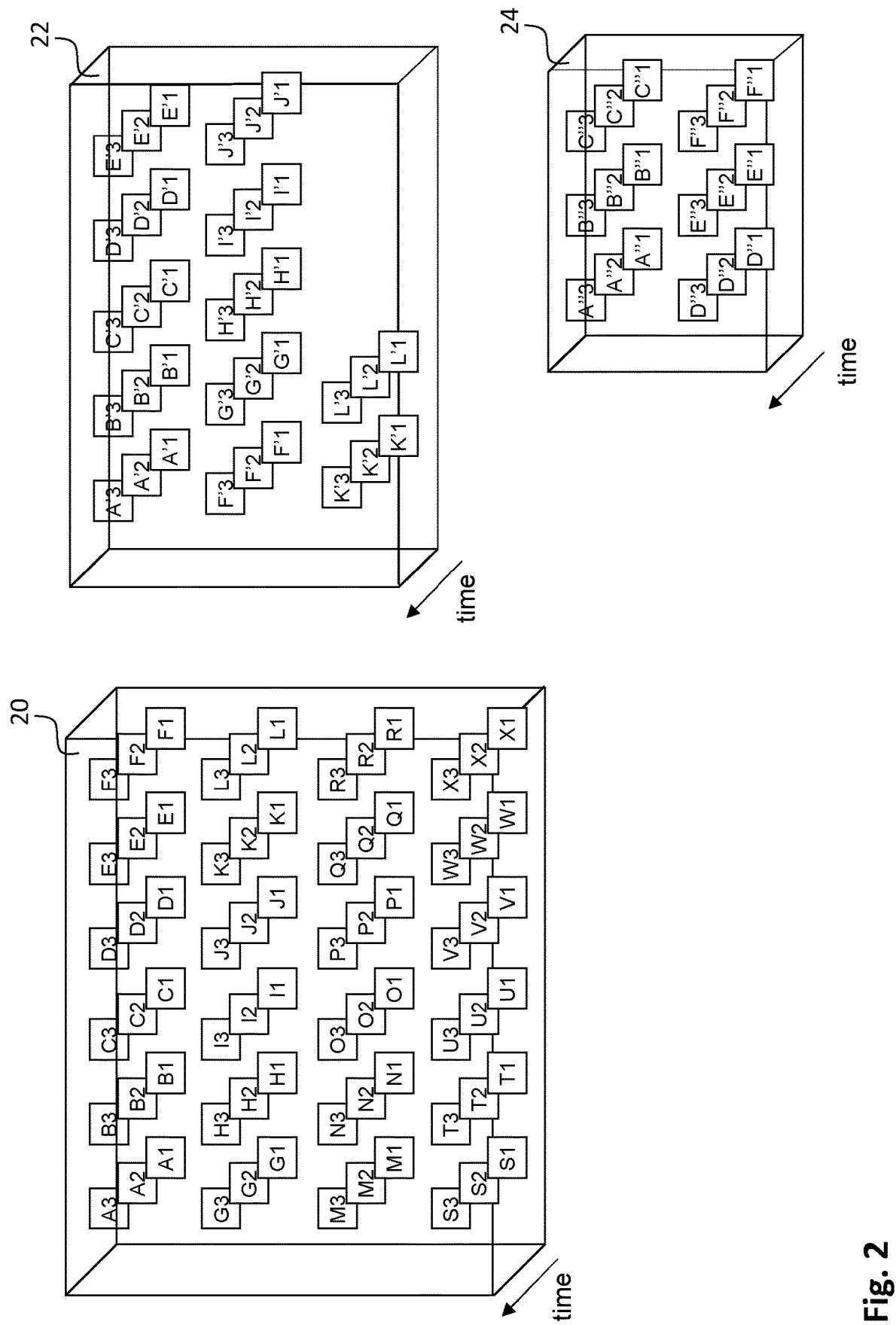
FIG. 2 visualizes three set of tile streams according to an embodiment.

FIG. 2 visualizes three set of tile streams according to an embodiment, namely a set of high quality tile streams 20, a set of intermediate quality tile streams 22 and a set of low quality tile streams 24. These tile streams represent different versions, in particular different quality versions, of the immersive video and may be stored on one or more servers of the server system. A set of tile streams is not necessarily stored on a single server. Even stronger, different tile frames belonging to the same tile stream may be stored on different servers of the server system. The tile streams that are stored on the server system may have been encoded, meaning that they have already been compressed and can be sent to the client device 1 upon receiving a request to this end.

In each set of tile streams, the capital letters indicate the different tile streams, while the numerals 1-3 indicate respective times with which the different tile frames in the tile frame are associated. Such times in the video may also be referred to as playtimes. To this end, each tile frame may comprise a time stamp and/or a video frame identifier, which indicates a time in the video. FIG. 2 for example shows for tile stream A in set 20 three separate tile frames, namely A1, A2, A3, for tile stream B in set 20 three tile frames B1, B2, B3, et cetera. The tile frames having the numeral "1" may be understood to, together, comprise, optionally encoded, video data representing the complete video frame of the complete immersive video, while tile frames having the numeral "2" indicated may be understood to, together, comprise, optionally encoded, video data representing a further complete video frame of the complete immersive video. Although only 24 tile streams are shown to be present in set 20, there may be many more tile streams, such as 54, or 108 tile streams.

The same principles apply to the set of intermediate quality tile streams 22 and the set of low quality tile streams 24. The set of intermediate quality tile streams 22 comprises the tile streams A'-L', and the set 24 of low quality tile streams comprises the tile streams A"-F". A tile frame indicated by a capital letter without apostrophe is a tile frame having a relatively high quality, a tile frame indicated by a capital with one apostrophe is a tile frame having a relatively intermediate quality, a tile frame indicated by a capital letter with two apostrophes is a tile frame having a relatively low quality.

In an example, the tile frames differ in quality in terms of the resolution of the video data that they represent. It should be appreciated that transmitting lower quality tile frames for rendering a certain spatial part of the entire immersive video requires less network resources than transmitting higher quality tile frames for rendering the same spatial part of the immersive video. The lower quality tile frames may be smaller in size in that they require less storage, than higher quality tile frames and/or less number of lower quality tile frames need to be transmitted for rendering a spatial part of the video than the number of higher quality tile frames that would need to be transmitted for rendering the same spatial part of the video.

The tile frames may be inter-coded tile frames, which may be understood as tile frames that are to be decoded on the basis of another decoded tile frame within the same tile stream. For example, tile frame Q2 may be an inter-coded tile frame in the sense that tile frame Q1 (in decoded form) is required for decoding encoded tile frame Q2.

The tile frames may be intra-coded tile frames, which may be understood as tile frames that can be decoded without reference to another decoded tile frame.

Preferably, for each quality level, multiple sets of tile streams are stored on the server system, wherein these multiple sets differ in how many intra-coded tile frames are present in their tile streams. (This is not shown in FIG. 2. FIG. 2 shows only one set of tile streams per quality level.) The advantage of using two such sets of encoded tile frames is that the motion-to-high-resolution latency can be reduced as described in detail in WO2019/048426.

Figure 3:
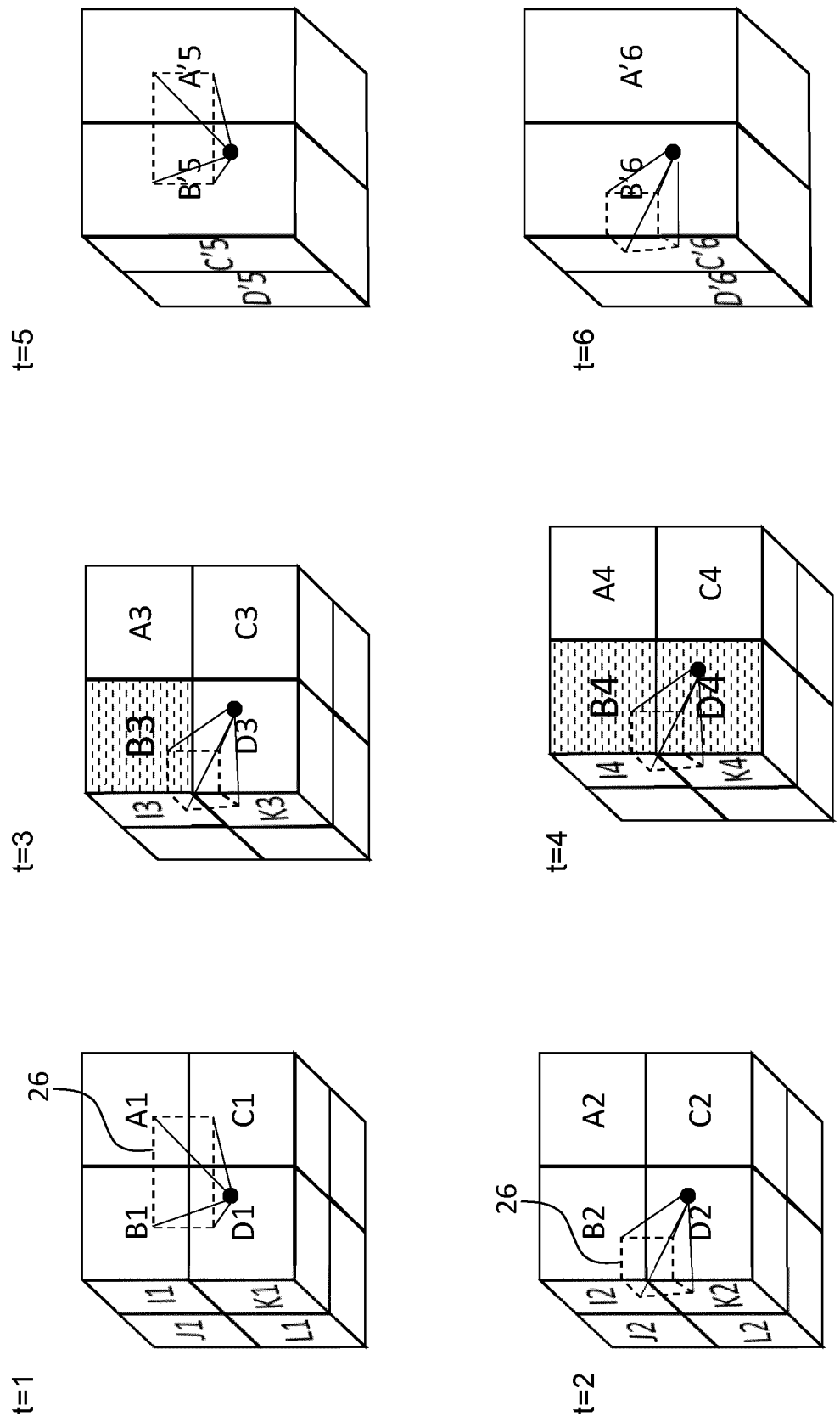
FIG. 3 visualizes the rendering process according to an embodiment.

FIG. 3 illustrates the general principle of tiled streaming as well as how different versions of the same video can be rendered using tile streams of different quality. In the figures, a current viewport is indicated by the dashed box 26.

FIG. 3 in particular shows an embodiment wherein at a first time instance t=1 the viewport comprises parts of tile streams A, B, C and D, comprises parts of tile frames A1, B1, C1, D1. These are high quality tile frames from the set of high quality tile streams 20 shown in FIG. 2. The client device 1 has correctly predicted that these tile frames would be in the viewport at t=1, and has transmitted a request for these tile frames, which may be understood to be a request for the tile streams comprising these tile frames, to the server system 2 and has received them in time so that at t=1 they can be properly rendered on a display of the client device. This rendering may comprise mapping the decoded tile frames, A1, B1, C1, D1, onto a three-dimensional structure. In this example, the three-dimensional structure is a cube. A renderer module in the data processing system can then, based on the mapping of the received decoded tile frames onto the three-dimensional structure and based on the current viewport, render the actual viewport on a display, for example on a head-mounted display.

At a further time instance, t=2, the viewport comprises parts of tile streams B, D, I, K, i.e. comprises parts of tile frames B2, D2, I2, K2. Again, these are tile frames from the set of high quality tile streams 20 shown in FIG. 2. Again, the client device 1 has correctly predicted that these tile frames would be in the viewport at t=2, and has transmitted a request for these tile frames, which may be understood to be a request for the tile streams comprising these tile frames, to the server system and has received them in time so that at t=2 the appropriate parts of tile frames B2, D2, I2, K2 can be properly rendered on a display of the client device 1.

These figure at t=1 and t=2 illustrate that tiled streaming is advantageous in that not all tile streams need to be requested from the server system at any given time. To illustrate, at t=1, the client device does not require tile frames I1, K1, J1, L1, because these tile frames are not in the viewport at t=1. At t=2, the client device does not require J2, L2, A2, C2, because these tile frames are not in the viewport at t=2 and therefore need not be rendered on the display of the client device 1. Hence, tiled streaming enables to greatly reduce the consumed network resources without negatively impacting user experience.

Continuing this embodiment, at t=3, the client device 1 can render the appropriate parts of tile frames I3, D3, K3, because these tile frames were received in time. However, tile frame B3 has been received too late as indicated by the dashed pattern of the tile. Consequently, the upper right portion of the viewport contains a spatial area where a high quality tile frame, tile frame B3 in this example, is missing. Instead, the client device may insert at this spatial area grey or black tiles. However, more preferably, low quality back-up tile frames are inserted in this spatial portion instead as will be explained in further detail with reference to FIG. 4. The value of the parameter associated with t=3 should reflect that a tile frame is missing. However, in this example, one not in time received tile frame does not influence the value of the parameter such that a switch is made to a lower quality tile stream.

However, at t=4, two tile frames, namely B4 and D4, although requested, are missing. In this example, these two missing tile frames cause the value of the parameter to become too low. In this example, the parameter is indicative of two tile frames out of the requested high quality tile streams B4, D4, I4, k4 being received not in time. As a result, based on the determined parameter value, the client device 4 refrains at least for some time period to request high quality tile streams from the set 20.

In this embodiment, the client device 1, based on the determined parameter value, switches to requesting intermediate quality tile streams from the set 22. Hence, at t=5 and t=6, the viewport contains parts of intermediate quality tile frames.

Figure 4:
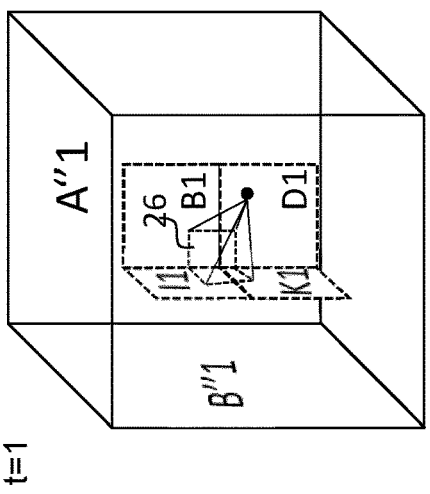
FIG. 4 illustrates an embodiment wherein always low quality tile frames are requested as back-up.

FIG. 4 illustrates an embodiment wherein always low quality tile frames are requested as back-up from the set 24 of low quality tile streams. These low quality tile frames may be received, decoded and the rendering process may involve mapping the low quality tile frames onto another three-dimensional structures (the outer cube in FIG. 4) that surrounds the three-dimensional structure (the inner cube) onto which the decoded high quality tile frames are mapped. Preferably, all low quality tile frames are requested always so that for any given time, all sides of the outer cube can be completely covered with low quality tile frames. This ensures that at any given time, some video data can be rendered, instead of having to insert grey or black tiles at spatial parts in the viewport for which no high quality tile frames were received in time. At t=1 in FIG. 4, the viewport contains parts of high quality tile frames B1, D1, I1, K1. Since these have been received in time, they are indeed present and can be properly rendered on the display of the client device.

However, at t=2, the viewport would contain parts of tile frames A2 and B2 (A2 not shown for clarity). However, only tile frame B2 was received in time. Tile frame A2 was received not in time and can therefore not be rendered. Fortunately, the low quality tile frame A"2 has been received in time. In this example, tile frame A"2 been mapped onto the outer cube as shown. Hence, part of low quality tile frame A"2 can be rendered on the display of the client device. In this example, the rendered viewport would thus contain at the left hand side a spatial part represented by the in time received high quality tile frame B2 and would contain at the right hand side a spatial part represented by low quality tile frame A"2.

Figure 5A:
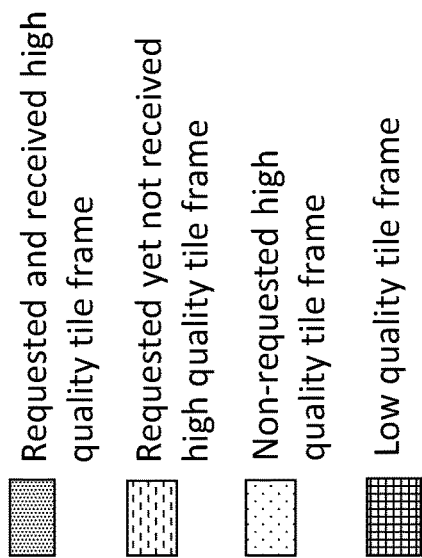
FIGS. 5A, 5B, 5C illustrate rendered viewports according to embodiments.
Figure 5A:
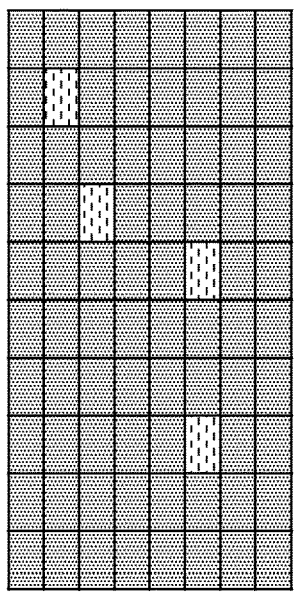
Figure 5B:
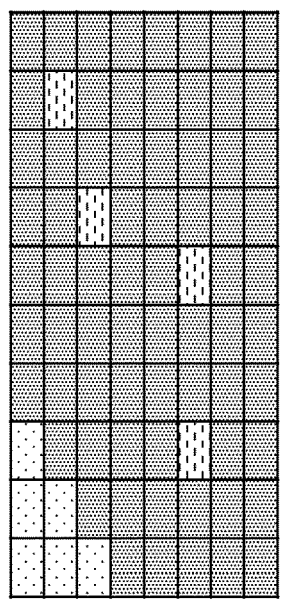
Figure 5C:
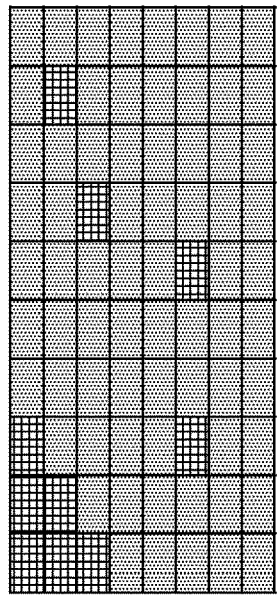

FIGS. 5A, 5B, 5C illustrate rendered viewports according to embodiments. Each rectangle in the depicted viewports is a spatial part of the viewport as represented by a tile frame. Herein, the densely dotted rectangles are spatial parts of the immersive video that are respectively represented by requested and in time received high quality tile frames. The dashed rectangles are spatial parts of the immersive video that are respectively represented by requested, yet not in time received tile frames. The sparsely dotted rectangles are spatial parts of the immersive video that are respectively represented by non-requested (and therefore not in time received) tile frames. The rectangles filled with horizontal and vertical lines are spatial parts of the immersive video that are respectively represented by requested and in time received low quality tile frames.

Thus, each of the viewports shown in FIGS. 5A, 5B, 5C has rendered tile frames from high quality tile streams at certain spatial parts and missing tile frames from high quality tile streams at other spatial parts in the viewport.

In FIG. 5A, at the spatial parts of the viewport represented by not in time received tile frames, for example grey or black tile frames may be inserted. Of course, this would highly distort the user experience and would therefore be undesired.

The viewport of FIG. 5B comprises two types of missing tile frames from high quality tile streams, namely missing high quality tile frames that are missing although requested and missing high quality tile frames that are missing because they have not been requested. The tile frames that are missing although requested by the client device may be missing because of bad network conditions. The tile frames that have not been requested by the client device may have not been requested because the client device wrongly predicted that these tile frames were not going to be in the rendered viewport. This may for example happen if a user unexpectedly instructs the client device to change the viewport, for example by the user suddenly moving his head where the client device is a head-mounted display. In such case, indeed, some high quality tile frames may be missing in the viewport simply because they have not been requested.

The viewport of FIG. 5C is the same as the viewport of FIG. 5B with the exception that low quality back up tile frames are inserted at the spatial parts for which no high quality tile frame is available.

In an embodiment, the value of the parameter indicative of how many requested high quality tile frames are received not in time for properly rendering them on the display is determined based on the rendered viewport.

In an example, the parameter is indicative of a size of the spatial area covered by spatial parts represented by not in time received yet requested high quality tile frames. The value for this parameter could for example be four times the size of the rectangles, for all three viewports in FIGS. 5A, 5B, 5C respectively.

In an example, the parameter is indicative of how many tile frames from high quality tile streams are missing in the rendered viewport. The value of this parameter could for example be four times the rectangle size for the viewport of FIG. 5A and ten times the rectangle size for each of viewports 5B and 5C. In this example, the parameter should still be understood as indicative of how many requested high quality tile frames are received not in time, even though this parameter also weighs in non-requested tile frames. In the context of tiled streaming, in principle, the number of non-requested tile frames in a viewport is limited, namely, and it is fair to say that typically a high quality tile frame is missing from the rendered viewport because it was not received in time although requested.

In an example, the parameter is indicative of a ratio between a size of a spatial area in the viewport covered by tile frames from low quality streams and the size of a further spatial area, i.e. the area covered by spatial parts represented by well received high quality tile frames. For viewport 5C, for example, such parameter could have the value 10/70. In this example, the parameter should still be understood as indicative of how many requested high quality tile frames are received not in time, even though this parameter also weighs in non-requested tile frames. In the context of tiled streaming, it is fair to say that an increase of this ratio is typically caused by more requested high quality tile frames being received not in time.

In an example, the parameter is indicative of a size of the further spatial area in the rendered view port covered by spatial parts represented by requested and in time received high quality tile frames. The value for such parameter could for example be 76 times the rectangle size for viewport 5A and 70 times the rectangle size for each of viewports 5B and 5C. In this example, the parameter should still be understood as indicative of how many requested high quality tile frames are received not in time, even though this parameter is influenced by non-requested and therefore not in time received high quality tile frames. In the context of tiled streaming, it is fair to say that a decrease in size of said further spatial area is typically caused by more requested high quality tile frames being received not in time.

In an example, the parameter is indicative of how many high quality tile frames are present in the rendered viewport. The value for such parameter could for example be 76 for viewport 5A and 70 for each of viewports 5B and 5C. In this example, the parameter should still be understood as indicative of how many requested high quality tile frames are received not in time, even though this parameter is influenced by non-requested and therefore not in time received high quality tile frames. In the context of tiled streaming, it is fair to say that a decrease in the number of high quality tile frames that are present in the rendered viewport is typically caused by more requested high quality tile frames being received not in time.

In an example, the parameter is indicative of a ratio between the size of said spatial area and the size of said further spatial area. The value for such parameter would for example be 4/76 for each of viewports 5A, 5B, 5C.

In an example, the parameter is indicative of a ratio between the size of said spatial area and a size of the rendered viewport. The value for such parameter would for example be 4/80 for each of viewports 5A, 5B, 5C.

In an example, the parameter is indicative of a ratio between the size of said further spatial area and the size of the rendered viewport. The value for such parameter would for example be 76/80 for viewport 5A and 70/80 for each of viewports 5B and 5C. In this example, the parameter should still be understood as indicative of how many requested high quality tile frames are received not in time, even though this parameter is influenced by non-requested and therefore not in time received high quality tile frames. In the context of tiled streaming, it is fair to say that, for example, that a decrease of the ratio between the size of the further spatial area and the size of the rendered viewport is typically caused by more requested high quality tile frames being received not in time.

In an example, the parameter is indicative of how many pixels the rendered viewport contains. In this example, the parameter should still be understood as indicative of how many requested high quality tile frames are received not in time, even though this parameter is influenced by non-requested and therefore not in time received high quality tile frames. In the context of tiled streaming, it is fair to say that a decrease of the number of pixels in the rendered viewport is typically caused by more requested high quality tile frames being received not in time.

An important advantage of determining the parameter based on the rendered viewport is that it can be easily measured and can gradually indicate worsening network conditions. The worse the network conditions become, the more requested high quality tile frames will be received not in time.

Preferably, for each rendered viewport, or at least for multiple rendered viewports, the value of the parameter is determined. In this way, a plurality of parameter values may be obtained associated with respective viewports. This allows for example to determine an average of the plurality of values, for example a running average, i.e. an average of the k most recently determined values (k being any suitably chosen integer number). Based on such determined average, the client device may refrain from requesting high quality tile streams at least for some time period. Additionally, this allows to monitor the rate of change of the parameter value over time. Based on the rate of change of the value for the parameter, the client device may refrain from requesting high quality tile streams.

Figure 6C:
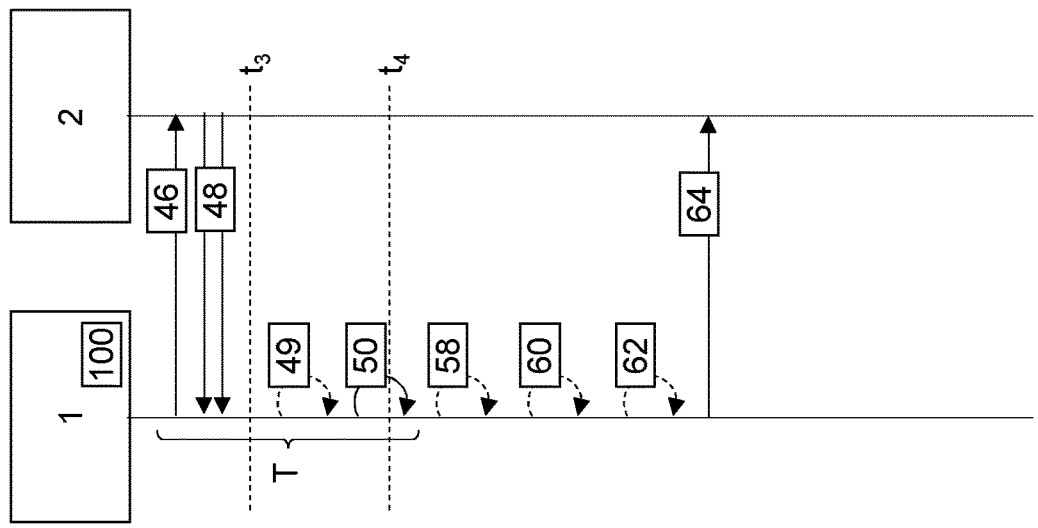
FIGS. 6A, 6B, 6C are flow charts illustrating embodiments of the method for requesting tile streams.
Figure 6B:
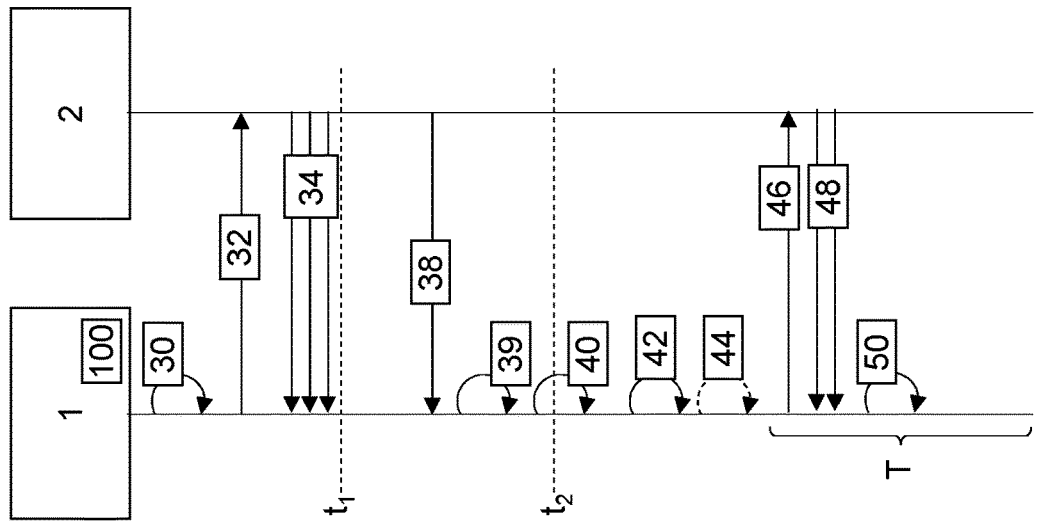
Figure 6A:
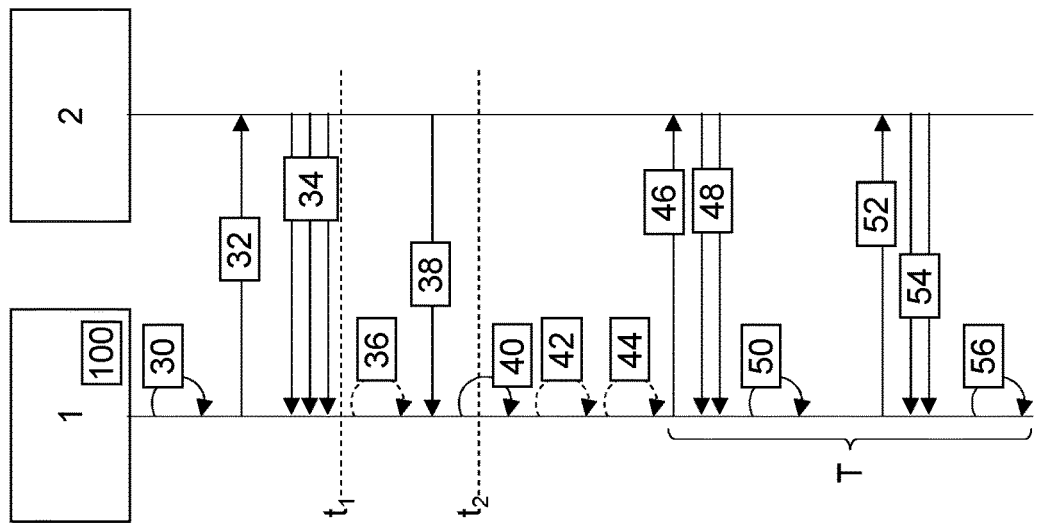

FIGS. 6A-6C are flow charts illustrating embodiments of the method for requesting tile streams.

In FIG. 6A, in step 30, high quality tile streams are selected from a first set of high quality tile streams. This step may involve the client device 1, in particular its data processing system 100, predicting the viewport for a particular time, t_2, which lies in the future. Thus, it is predicted which spatial part of the immersive video will be in the viewport at the particular time t_2 and is thus expected to be rendered at the particular time t_2. This prediction may be performed on previously rendered viewports. It may for example be that the viewport had a certain movement across the video. Then the viewport at the particular time t_2 may be determined based on this movement. In another example, the viewport may have remained steady, i.e. the same spatial part of the video remained in the viewport for some time. Based on this, the viewport at the particular time t_2 may be predicted to be the same in the sense that the same spatial part of the immersive video is expected to be in the viewport at the particular (future) time t_2.

The selected high quality tile streams comprise respective tile frames associated with the particular time t_2 for rendering a spatial region of the immersive video at said particular time t_2. Preferably the spatial region comprises the expected viewport at said particular time.

In step 32, the client device 1, in particular the data processing system 100, for example by using a transceiver referred to in FIG. 1, transmits a request to the server system 2 for the selected high quality tile streams. This request may be transmitted in one or more messages and/or in one or more data packets.

In response, in step 34, the server system transmits, and the client device 1 receives requested tile frames associated with the particular time t_2 in time for properly rendering them on the display of the client device 1 at said particular time t_2.

In the depicted embodiment, the tile frames that are to be rendered at t_2, should be received at t_1 at the latest. The tile frames should typically be decoded before they can be rendered, for example, which takes some time. The time it takes to decode and render a tile frame can be can be measured using methods known in the art.

Optionally, step 36 is performed, which comprises determining that one or more of the requested high quality tile frames are not received in time for properly rendering them on the display at t_2. This step optionally comprises counting how many requested high quality tile frames have not yet been received at t_1. Based on the determination that one or more high quality tile frames have not been received, the value for the parameter can be determined. In an example, the parameter indicates how many requested tile frames have not yet been received at t_1.

In this example, in step 38, a requested high quality tile frame is still received by the client device 1. However, too late for properly rendering it on the display at t_2.

In step 40, which is performed at t_2, the client device renders the appropriate viewport using at least some of the requested and received high quality tile frames.

Optionally, the value for the parameter indicative of how many of the requested tile frames are received not in time is determined after the viewport has been rendered, in step 42. Then, the value may be determined based on the actually rendered viewport rendered at t_2. How this value may be determined has been explained with reference to FIG. 5.

Then, based on the determined value for the parameter, whether it is determined in step 36 or in step 42, the client device refrains, at least for some time period T, from requesting high quality tile streams out of the first set of high quality tile streams from the server system. This refraining may be performed based on an optional comparison between the determined value and a threshold value, indicated by optional step 44. If the determined parameter value indicates that too many requested tile frames are received not in time, then this may cause the client device to refrain from requested high quality tile frames. In such case, the network conditions are likely too bad to ensure that high quality tile frames are delivered in time to the client device 1.

Therefore, in step 46 the client device does not request high quality tile streams anymore. In this embodiment, instead, lower quality tile streams are requested, for example from the set 22 and/or set 24 depicted in FIG. 2. Step 48 depicts that tile frames from these requested streams are received in time so that they can be properly rendered in step 50.

Likewise, step 52 indicates that lower quality tile streams are requested, and step 54 depicts that tile frames from these requested streams are received in time so that they can be properly rendered in step 56.

It should be appreciated that each request for a tile stream is typically a request for a plurality of tile frames from this tile stream. To illustrate, the request 32 is typically a request for video data for rendering multiple viewports, not only the viewport that is rendered at t_2. The value for the parameter can be determined for each rendered viewport. Thus, there may be additional rendering of viewports between step 44 and step 46, and a value for the parameter may be determined for each rendered viewport, or at least for more than one of these rendered viewports. Further, each determined value may be compared with a threshold value as described herein.

The step of refraining from requesting high quality tile frames may be performed based on multiple determined values for the parameter and/or based on multiple comparisons between the determined values and the threshold value.

FIG. 6B illustrates an embodiment wherein a movement of the viewport across the immersive video is measured in step 39. (The other steps have been explained with reference to FIG. 6A.) Measuring movement of the viewport may be performed by measuring head movement of a user wearing the client device 1 as a head mounted display. In such case, the step of refraining from requesting high quality tile frames in time period T is based on the measured head movement as well. If the viewport is significantly moving across the viewport, especially in an unpredicted manner, then it may be that the client device has not requested the correct tile streams in order to render the entire viewport at some time. In such case, the rendered viewport may comprise a significant spatial area where high quality tile frames are missing. However, such bad viewport in such case is to a lesser extent caused by bad network conditions, and to a greater extent by the significant movement of the viewport. In such case, it may not be appropriate to refrain from requesting high quality tile streams.

Optionally, in step 39, the threshold value is determined with which the determined value for the parameter, determined based on the rendered viewport, is compared in optional step 44. In principle, the more significant the movement of the viewport across the immersive video, the more missing high quality tile frames are acceptable in terms of deciding whether to switch to requesting lower quality tile streams or not.

FIG. 6C illustrates how the client device 1 may switch to requesting higher quality tile streams again. FIG. 6C shows the step 46 of requesting lower quality tile streams and step 48 of receiving these lower quality tile streams in time, i.e. before t_3, for properly rendering them on the display, step 50 at t_4. The value for the parameter can be determined again, only now for the requested lower quality tile streams. Again, this value can be determined in a step 49, which in this example comprises determining that all requested lower quality tile streams, e.g. from the set 22 and/or the set 24 of FIG. 2, have been received in time. Additionally or alternatively, the value can be determined in a step 58, based on the viewport rendered in step 50.

The determined value may be compared with a threshold value as indicated by optional step 60.

Further, optional step 62 comprises determining values of other parameters that are indicative of network conditions, such as bandwidth, round-trip-time and/or buffer levels. Preferably, again, the values for the parameter is determined repeatedly.

Based on the determined one or more values, in particular based on comparisons between the one or more values and a threshold value, and/or based on the parameter values determined in step 62, the client device may determine to switch back to requesting high quality tile streams again. Step 64 illustrates the client device requesting high quality tile streams again.

In another embodiment (not shown), the time period T has some predetermined length and, after this period, the client device 1 starts requesting high quality tile streams again. Then, the process of FIG. 6A may be performed again. In this embodiment, it is simply tried out whether the network conditions are again good enough for delivering high quality tile streams in time to the client device.

Figure 7:
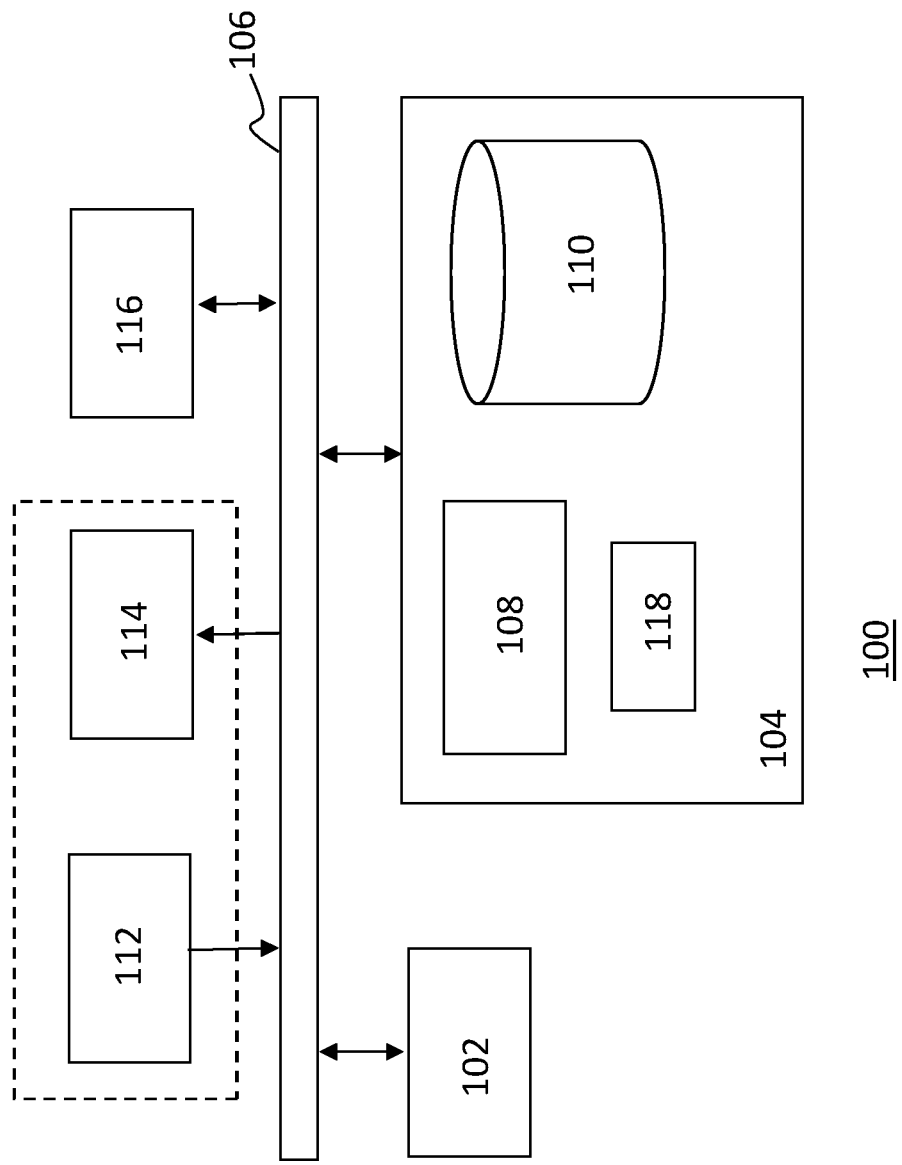
FIG. 7 illustrates a data processing system according to an embodiment.

FIG. 7 depicts a block diagram illustrating a data processing system according to an embodiment.

As shown in FIG. 7, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, a touch-sensitive display, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 7, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 7) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In one aspect of the present invention, the data processing system 100 may represent a client device as described herein.

In another aspect, the data processing system 100 may represent a client data processing system. In that case, the application 118 may represent a client application that, when executed, configures the data processing system 100 to perform the various functions described herein with reference to a "client". Examples of a client can include, but are not limited to, a personal computer, a portable computer, a mobile phone, or the like.

In yet another aspect, the data processing system 100 may represent a server. For example, the data processing system may represent an (HTTP) server, e.g. a server out of the server system 2, in which case the application 118, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration but is not intended to be exhaustive or limited to the implementations in the form disclosed. Many modifications and variations will be apparent to those of ordinary skill in the art. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A computer-implemented method for requesting tile streams for rendering a spatial part of an immersive video on a display of a client device, wherein
a server system stores a plurality of tile streams, each tile stream representing a spatial part of the immersive video, each tile stream comprising a sequence of tile frames that are associated with respective times in the video, and
the plurality of tile streams comprises a first set of high quality tile streams having a relatively high quality and a second set of one or more low quality tile streams having a relatively low quality and/or a third set of one or more intermediate quality tile streams having a relatively intermediate quality, wherein the first set of high quality tile streams represents a first version of the immersive video and the second set of one or more low quality tile streams represents a second version of the immersive video and/or the third set of intermediate quality tile streams represents a third version of the immersive video, the method comprising
(i) selecting high quality tile streams from the first set of high quality tile streams, the selected high quality tile streams comprising respective tile frames associated with a particular time for rendering a spatial region of the immersive video at said particular time,
(ii) transmitting a request to the server system for the selected high quality tile streams,
(iii) receiving one or more of said tile frames associated with the particular time out of the requested high quality tile streams in time for properly rendering them on the display at said particular time,
(iv) receiving one or more of said tile frames associated with the particular time out of the requested high quality tile streams not in time for properly rendering them on the display at said particular time,
(v) determining a value for a parameter indicative of how many of said one or more tile frames associated with the particular time out of the requested high quality tile streams are received not in time for properly rendering them on the display at the particular time,
(vi) based on the determined value for the parameter, refraining, at least for some time period, from requesting high quality tile streams out of the first set of high quality tile streams from the server system, and
(vii) during said time period, requesting one or more low quality tile streams from the second set of one or more low quality tile streams from the server system and/or requesting one or more intermediate quality tile streams from the third set of one or more intermediate quality tile streams from the server system.

2. The method according to claim 1, comprising
based on the determined value for the parameter, requesting, during said time period, one or more intermediate quality tile streams from the third set of one or more intermediate quality tile streams from the server system, and/or
based on the determined value for the parameter, requesting, during said time period, one or more low quality tile streams from the second set of one or more low quality tile streams from the server system.

3. The method according to claim 2, further comprising rendering a viewport at said particular time on the display of the client device, the rendered viewport comprising first one or more spatial parts of the immersive video that are respectively represented by one or more of the in time received tile frames and second one or more spatial parts of the immersive video that are respectively represented by one or more of the not in time received tile frames thus the rendered viewport having one or more rendered tile frames from high quality tile streams at the first one or more spatial parts and the rendered viewport missing one or more tile frames from high quality tile streams at the second one or more spatial parts in the viewport, said second one or more spatial parts covering a spatial area in the rendered viewport.

4. The method according to claim 3, further comprising determining said value for the parameter based on the rendered viewport.

5. The method according to claim 1, further comprising
rendering a viewport at said particular time on the display of the client device, the rendered viewport comprising first one or more spatial parts of the immersive video that are respectively represented by one or more of the in time received tile frames and second one or more spatial parts of the immersive video that are respectively represented by one or more of the not in time received tile frames thus the rendered viewport having one or more rendered tile frames from high quality tile streams at the first one or more spatial parts and the rendered viewport missing one or more tile frames from high quality tile streams at the second one or more spatial parts in the viewport, said second one or more spatial parts covering a spatial area in the rendered viewport.

6. The method according to claim 5, further comprising determining said value for the parameter based on the rendered viewport.

7. The method according to claim 6, wherein the parameter is indicative of a size of said spatial area covered by the second one or more spatial parts.

8. The method according to claim 6, comprising
repeatedly determining a value for the parameter by repeatedly performing the sequence of steps (i)-(v), albeit for different respective times in the video, and
based on the determined values for the parameter, refraining, at least for some time period, from requesting high quality tile streams out of the first set of high quality tile streams from the server system.

9. The method according to claim 8, wherein repeatedly determining a value for the parameter comprises repeatedly rendering viewports at respective times and determining, for each rendered viewport, an associated value for the parameter based on the rendered viewport in question.

10. The method according to claim 9, wherein the step of, based on the determined value for the parameter, refraining, at least for some time period, from requesting high quality tile streams out of the first set of high quality tile streams from the server system, comprises comparing the determined value for the parameter with a threshold value and, based on this comparison, refraining, at least for some time period, from requesting high quality tile streams out of the first set of high quality tile streams from the server system.

11. The method according to claim 9, further comprising measuring movement of the viewport across the immersive video, wherein the step of refraining from requesting high quality tile streams from the server system is performed based on the measured movement of the viewport as well, measuring movement of the viewport across the immersive video, wherein the step of refraining from requesting high quality tile streams from the server system is performed based on the measured movement of the viewport as well.

12. The method according to claim 3, comprising transmitting a request to the server system for one or more low quality tile streams from the second set of one or more low quality tile streams, the requested one or more low quality tile streams comprising respective one or more tile frames associated with the particular time for rendering at least part of the immersive video at the particular time, and receiving one or more of the tile frames associated with the particular time out of the requested low quality tile streams, wherein the viewport is rendered such that the rendered viewport comprises, at each spatial portion in the viewport for which no tile frame out of a high quality tile stream is available, at least a part of a received tile frame associated with the particular time out of a low quality tile stream.

13. The method according to claim 1, wherein the parameter is indicative of the size of said spatial area covered by said second one or more spatial parts, and/or how many tile frames from high quality tile streams are missing in the rendered viewport, and/or a size of a further spatial area in the rendered view port covered by said first one or more spatial parts, and/or how many tile frames from the first set of high quality tile streams are present in the rendered viewport, and/or a ratio between the size of said spatial area and the size of said further spatial area, and/or a ratio between the size of said spatial area and a size of the rendered viewport, and/or a ratio between the size of said further spatial area and the size of the rendered viewport, and/or how many pixels the rendered viewport contains, and/or a resolution of the rendered viewport, and/or a ratio between the size of the further spatial area and a size of a spatial area in the viewport covered by tile frames from low quality streams.

14. The method according to claim 1, wherein determining the value for the parameter comprises determining that one or more of said tile frames associated with the particular time out of the requested high quality tile streams are not received in time for properly rendering them on the display at said particular time.

15. The method according to claim 1, wherein the step of, based on the determined value for the parameter, refraining, at least for some time period, from requesting high quality tile streams out of the first set of high quality tile streams from the server system, comprises comparing the determined value for the parameter with a threshold value and, based on this comparison, refraining, at least for some time period, from requesting high quality tile streams out of the first set of high quality tile streams from the server system.

16. The method according to claim 1, further comprising measuring movement of the viewport across the immersive video, wherein the step of refraining from requesting high quality tile streams from the server system is performed based on the measured movement of the viewport as well.

17. A data processing system that is configured to perform the method according to claim 1.

18. A computer program stored on a non-transitory computer-readable storage medium comprising instructions which, when the program is executed by a computer, cause the computer to carry out the method according to claim 1.

19. The method according to claim 1, wherein the spatial region comprises an expected viewport at said particular time.

20. The method according to claim 1, comprising repeatedly determining a value for the parameter by repeatedly performing the sequence of steps (i)-(v), albeit for different respective times in the video, and based on the determined values for the parameter, refraining, at least for some time period, from requesting high quality tile streams out of the first set of high quality tile streams from the server system.

\* \* \* \* \*